(12) United States Patent
Lersch et al.

(10) Patent No.: US 7,101,423 B2
(45) Date of Patent: Sep. 5, 2006

(54) RESPIRATORY AIR FILTER

(76) Inventors: Ulrich Lersch, Patriciusstrasse 15, 50259 Pulheim (DE); Petro Nicolis, Im Gewerbegebiet Pesch 3, 50767 Koln (DE)

( * ) Notice: Subject to any disclaimer, the term of this patent is extended or adjusted under 35 U.S.C. 154(b) by 185 days.

(21) Appl. No.: 10/476,091

(22) PCT Filed: Apr. 24, 2002

(86) PCT No.: PCT/DE02/01507

§ 371 (c)(1),
(2), (4) Date: Feb. 23, 2004

(87) PCT Pub. No.: WO02/085426

PCT Pub. Date: Oct. 31, 2002

(65) Prior Publication Data

US 2004/0144255 A1    Jul. 29, 2004

(30) Foreign Application Priority Data

Apr. 24, 2001 (DE) .............................. 101 20 182
Oct. 29, 2001 (DE) .............................. 101 52 785

(51) Int. Cl.
*B03C 3/32* (2006.01)

(52) U.S. Cl. ............... 96/68; 55/DIG. 33; 55/DIG. 35; 55/DIG. 42; 96/69; 128/206.12; 128/206.18; 128/206.19

(58) Field of Classification Search ............................. 128/206.12–206.14, 206.17–206.19; 96/68, 96/69; 55/385.1, DIG. 33, DIG. 35, DIG. 42
See application file for complete search history.

(56) References Cited

U.S. PATENT DOCUMENTS

| | | | | |
|---|---|---|---|---|
| 2,572,254 A | * | 10/1951 | Folberth | 128/206.18 |
| 3,316,904 A | * | 5/1967 | Wall et al. | 128/206.12 |
| 3,451,392 A | * | 6/1969 | Cook et al. | 128/206.11 |
| 3,971,373 A | * | 7/1976 | Braun | 128/206.19 |
| 4,100,324 A | * | 7/1978 | Anderson et al. | 442/344 |
| 4,240,420 A | * | 12/1980 | Riaboy | 128/206.14 |
| 4,382,440 A | * | 5/1983 | Kapp et al. | 128/201.25 |
| 4,429,001 A | * | 1/1984 | Kolpin et al. | 442/340 |
| 4,600,002 A | * | 7/1986 | Maryyanek et al. | 128/206.19 |
| 4,643,182 A | * | 2/1987 | Klein | 128/201.25 |
| 4,883,052 A | * | 11/1989 | Weiss et al. | 128/205.27 |
| 4,992,084 A | * | 2/1991 | Von Blucher et al. | 96/131 |
| 5,275,154 A | * | 1/1994 | Von Blucher et al. | 128/205.27 |
| 5,284,704 A | * | 2/1994 | Kochesky et al. | 442/364 |
| 5,400,780 A | * | 3/1995 | Nishino | 128/205.27 |
| 5,452,712 A | * | 9/1995 | Richardson | 128/201.25 |
| 5,593,479 A | * | 1/1997 | Frey et al. | 96/57 |

(Continued)

FOREIGN PATENT DOCUMENTS

EP            339487        * 11/1989

(Continued)

*Primary Examiner*—Richard L. Chiesa
(74) *Attorney, Agent, or Firm*—Scott R. Hansen; Fulwider Patton LLP

(57) ABSTRACT

A respiratory filter includes an air-permeable sleeve and at least one filter layer that is arranged in the sleeve and contains activated carbon. The activated carbon contained in the filter layers serves as a gas filter that, by absorption, at least partially removes the noxious gases that are contained in the air inhaled.

31 Claims, 1 Drawing Sheet

U.S. PATENT DOCUMENTS

| | | | |
|---|---|---|---|
| 5,656,368 A | * | 8/1997 | Braun et al. ................. 428/141 |
| 5,667,562 A | * | 9/1997 | Midkiff ......................... 96/15 |
| 6,102,039 A | * | 8/2000 | Springett et al. ...... 128/206.12 |
| 6,214,094 B1 | * | 4/2001 | Rousseau et al. .............. 96/15 |
| 6,296,691 B1 | * | 10/2001 | Gidumal ........................ 96/17 |
| 6,332,465 B1 | * | 12/2001 | Xue et al. .............. 128/207.11 |
| 6,357,440 B1 | * | 3/2002 | Hansen et al. ......... 128/206.19 |
| 6,432,175 B1 | * | 8/2002 | Jones et al. .................... 96/15 |
| 6,527,834 B1 | * | 3/2003 | Jorder et al. ................... 96/68 |
| 6,543,450 B1 | * | 4/2003 | Flynn .................... 128/206.19 |
| 2001/0013347 A1 | * | 8/2001 | Rekow et al. ......... 128/205.27 |

FOREIGN PATENT DOCUMENTS

| | | | | |
|---|---|---|---|---|
| GB | 2028664 | * | 3/1980 | ............ 128/206.19 |
| JP | 54-162277 | * | 12/1979 | .................... 96/59 |

* cited by examiner

RESPIRATORY AIR FILTER

RELATED APPLICATIONS

This application claims the benefit of PCT International application Serial No. PCT/DE02/01507, filed Apr. 24, 2002 which claims the benefits of German application Serial Nos. 101 20 182.6, filed Apr. 24, 2001 and 101 52 785.3, filed Oct. 29, 2001.

BACKGROUND OF THE INVENTION

1. Field of the Invention

The invention relates to a respiratory air filter.

2. Description of Related Art

In the prior art, filter devices are known that have a half mask and a filter element associated therewith. When needed, a person places the half mask over the nose and mouth such that he can only inhale air that has previously flowed through the filter element into the mask. Such filter devices are relatively complex in design and not suitable for low-cost mass production.

Consequently, the object of the invention is to provide a respiratory air filter that is designed as simply as possible and is inexpensive to produce.

SUMMARY OF THE INVENTION

The object of the invention is achieved with a respiratory filter, with an air-permeable sleeve; and at least one filter layer that is arranged in the sleeve and contains activated carbon.

This respiratory air filter is very simple and is constructed from low-cost materials such that it is particularly well suited for mass production. As it only has to be large enough to adequately cover the nose and mouth of the person, it is very compact and convenient. Because of its low price and its small dimensions, it can be taken everywhere by everyone, like paper tissues or chewing gum and is thus ready for use at any time. It can, for example, be taken along with no problem in the glove compartment of an automobile in sufficient numbers for the occupants such that, in the event of a tunnel fire, they can delay poisoning by a possibly critical period of time.

The activated carbon contained in the filter layers serves as a gas filter that, by absorption, at least partially removes the noxious gases that are contained in the air inhaled.

Additional characteristics and embodiments of the invention are described in the dependent claims.

Provision may be made that the sleeve be made of nonwoven fabric. Of course, other textile fabrics, such as felts, knits, woven fabrics, and knitted fabrics may also be used for the sleeve; however, compared to these, nonwoven fabrics are much less expensive to produce.

In this case, provision may be made that the nonwoven fabric be made of polypropylene fibers. Such polypropylene fibers can be electrostatically charged particularly simply and permanently. Since this is generally known in the prior art, further details are not given here.

Moreover, provision may be made that the nonwoven fabric be a spun-bonded nonwoven fabric, which may be produced, for example, by melt blowing, also referred to in the prior art as the melt blown method.

Additionally, provision may be made that the sleeve have a weight per unit area, also referred to as density per unit area, of 30 to 40 $g/m^2$, preferably of 35 $g/m^2$.

Provision may further be made that the sleeve be electrostatically charged. Since the sleeve is electrostatically charged, it can retain particles such as soot, dust, smoke, smog, and the like particularly well. The sleeve thus acts as a particle filter.

Moreover, provision may be made that at least one filter layer be made of nonwoven fabric. Here also, other textile fabrics may be used; however, nonwoven fabrics are preferred because of their low price.

In this case, provision may be made that each filter layer made of nonwoven fabric have a weight per unit area of 170 to 210 $g/m^2$, preferably of 190 $g/m^2$.

In addition, provision may be made that at least one filter layer have activated carbon pellets that are bonded to each other.

In this case, provision may be made that the activated carbon pellets are bonded to each other using an adhesive. Such a filter layer can then easily have activated carbon with a weight per unit area of 1000 to 1300 $g/m^2$, preferably 1265 $g/m^2$ and adhesive with a weight per unit area of only 300 to 400 $g/m^2$, preferably 335 $g/m^2$, such that the proportion of activated carbon, at approximately 79 wt.-% in the preferred case, is clearly greater than in the conventional active carbon filter mats.

The adhesive may be a, preferably open-cell, polyurethane foam. However, other materials may also be used as the adhesive.

Moreover, provision may be made that each filter layer with activated carbon pellets bonded on each other have a weight per unit area of 250 to 2700 $g/m^2$, preferably 1400 to 1800 $g/m^2$, preferably 1500 to 1700 $g/m^2$, and preferably 1600 $g/m^2$.

Provision may further be made that the proportion of activated carbon be between 70 and 90 wt.-%, preferably between 75 and 85 wt.-%, preferably 80 wt.-%, and the proportion of adhesive be between 10 and 30 wt.-%, preferably between 15 and 25 wt.-%, preferably 20 wt.-%.

Provision may also be made that at least one filter layer have a matrix material and activated carbon bonded pellets thereto.

In this case, provision may be made that the matrix material be a, preferably open-cell and/or reticulated, polyurethane foam. However, other materials may also be used as the matrix material.

In this case, provision may further be made that the activated carbon pellets be bonded with the matrix material using an adhesive. The adhesive may be an acrylate adhesive. However, other materials may also be used as the adhesive. Such a filter layer can then easily have a weight per unit area of 1000 to 1300 $g/m^2$, preferably 1265 $g/m^2$ and matrix material and adhesive together with a weight per unit area of only 300 to 400 $g/m^2$, preferably 335 $g/m^2$, such that the proportion of activated carbon, at approximately 79 wt.-% in the preferred case, is clearly greater than with the conventional activated carbon filter mats.

Moreover, provision may be made that each filter layer with activated carbon pellets bonded with a matrix material have a weight per unit area of 250 to 2700 $g/m^2$, preferably 1400 to 1800 $g/m^2$, preferably 1500 to 1700 $\mu m^2$, and preferably 1600 $g/m^2$.

Provision may further be made that the proportion of activated carbon be between 70 and 90 wt.-%, preferably between 75 and 85 wt.-%, preferably 80 wt.-%, and the proportion of matrix material and adhesive together be between 10 and 30 wt.-%, preferably between 15 and 25 wt.-%, preferably 20 wt.-%.

Moreover, provision may be made that the pellets be granules and/or crystals. The granules that are also called granular pellets are in each case asymmetric aggregates of powder particles, such as crystals or crystal fragments.

In addition, provision may be made that the pellets have a grain size of 0.01 to 1.0 mm, preferably 0.1 to 0.5 mm.

Additionally, provision may be made that the activated carbon be loaded with oxygen and/or ozone. For this purpose, the activated carbon is exposed to the corresponding gas until it has absorbed the desired amount of gas, before the respiratory air filter is packaged, preferably gas-impermeably. This may take place, for example, in that the assembled respiratory air filter is stored in a corresponding gas atmosphere. During use of the respiratory air filter, the oxygen- and/or ozone-loaded activated carbon releases this into the respiratory air flowing through the filter layer such that this is enriched with oxygen and/or ozone before it is inhaled. Thus, the respiratory air filter also serves as an oxygen source.

Provision may also be made that at least one filter layer have a means to filter carbon monoxide.

In this case, provision may further be made that the means cause an oxidation from carbon monoxide to carbon dioxide. The means may include at least one hopcalite. The hopcalite may consist, for example, of 60% MnO2 and 40% CuO or of 50% MnO2, 30% CuO, 15% cobalt oxide, and 5% Ag2O.

Provision may also be made that at least two filter layers be arranged on top of each other and an air-permeable separation layer lie between each two adjacent filter layers. Since the filtering capability increases with the number of filter layers, it is desirable that the respiratory air to be purified must pass through as many filter layers as possible before it is inhaled. Unfortunately, with an increasing number of filter layers, flow resistance also increases; flow resistance can be clearly reduced by the separation layers compared to a stack of filter layers in which the filter layers are stacked directly on each other.

In this case, provision may be made that each separation layer be made of nonwoven fabric. Here again, other textile fabrics may be used; however, nonwoven fabrics are preferred because of their lower price.

Provision may also be made that the nonwoven fabric be made of polyester fibers.

In addition, provision may be made that the nonwoven fabric be a perforated spun lace fabric, i.e., a nonwoven fabric that is mechanically reinforced, for example, by needling, intermeshing, or intermingling using water jets and has a perforation pattern. Production of such perforated spun lace fabric is known in the prior art so it will not be further described here.

In addition, provision may be made that each separation layer have a weight per unit area of 35 to 65 $g/m^2$, preferably of 50 $g/m^2$.

Provision may also be made that the sleeve be enclosed in a gas-impermeable package.

In the following, preferred exemplary embodiments are described in detail with reference to the accompanying drawings.

DETAILED DESCRIPTION OF THE PREFERRED EMBODIMENTS

Figure 1:
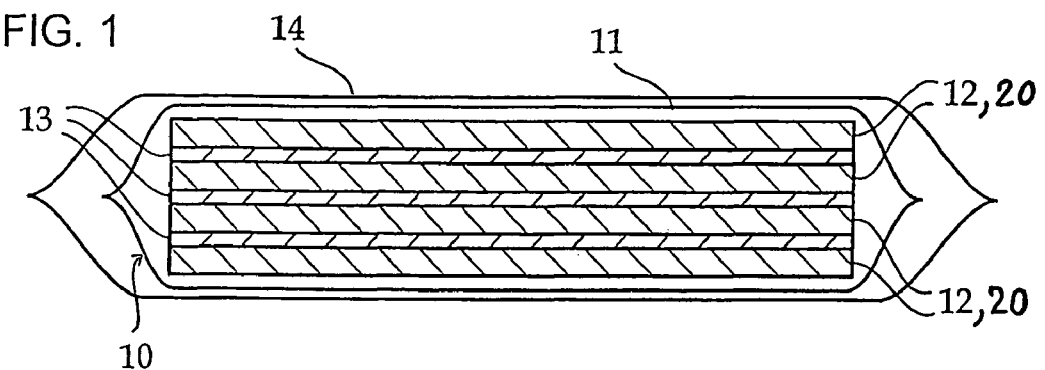
FIG. 1 is a cross section of a respiratory air filter in a first embodiment that is gas-impermeably packaged.

FIG. 1 depicts a respiratory of filter 10 in a first embodiment. It has an air-permeable sleeve 11, four filter layers 12, and three air-permeable separation layers 13.

The sleeve 11 is made of a spun-bonded nonwoven fabric that is produced from polypropylene fibers by melt spinning. The nonwoven fabric is permanently charged electrostatically and has a weight per unit area of 30 to 40 $g/m^2$, preferably 35 $g/m^2$.

Each filter layer 12 is made of a rectangular piece of nonwoven fabric that has a width of 5 to 9 cm, preferably 7 cm, a length of 9 to 13 cm, preferably 11 cm, a thickness of 1 to 3 preferably 2 mm, and a weight per unit area of 170 to 210 $g/m^2$, preferably 190 $g/m^2$. The nonwoven fabric of the filter layers 12 serves, for one thing, as a particle filter 20, and for another, as a carrier for activated carbon, which, in turn, serves as a gas filter. The production of such active carbon filter mats is known in the prior art, so it is not further described here.

Each separation layer 13 is made of a rectangular piece of spun lace nonwoven fabric that has substantially the same width and length as the filter layers 12, a thickness of 0.5 to 1.5 mm, preferably 1.0 mm and a weight per unit area of 35 to 65 $g/m^2$, preferably 50 $g/m^2$. The nonwoven fabric is made of polyester fibers and has a perforation pattern.

The four filter layers 12 and the three separation layers 13 are arranged alternatingly on top of each other such that they form a right parallelepiped-shaped stack in which a separation layer 13 lies between each two adjacent filter layers 12. This stack is surrounded by the sleeve 11, which is, in turn, gas-impermeably enclosed in a packaging film 14.

Figure 2:
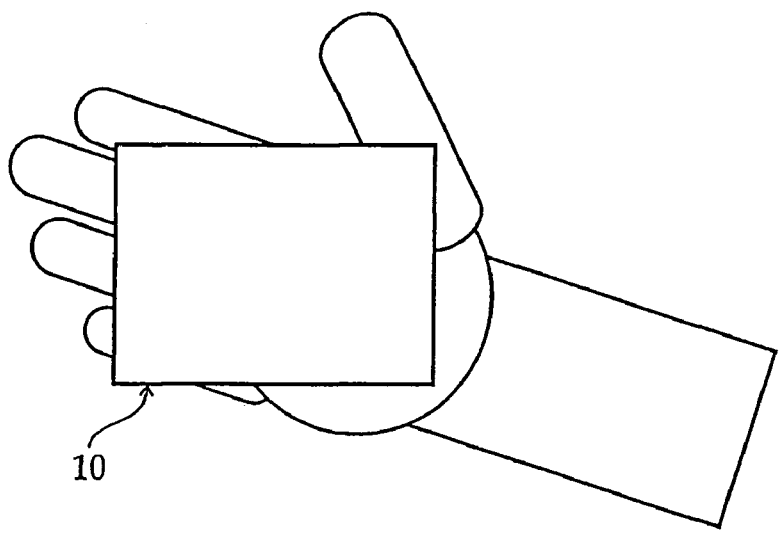
FIG. 2 is a top plan view of the respiratory air filter of FIG. 1, held in the palm of the hand.

When needed, the person tears open the packaging film and removes the respiratory air filter 10 therefrom. He places it in his hand, as depicted in FIG. 2, and presses it together on the transverse sides between the fingers and the ball of the thumb so that the side away from the hand is arched slightly concave. The person then holds the respiratory air filter 10 with this concave side on his face such that it simultaneously covers the mouth and nose. Then, when the person inhales, the air flows between the fingers to the respiratory air filter 10 and through it on into the mouth and/or nose.

Figure 3:
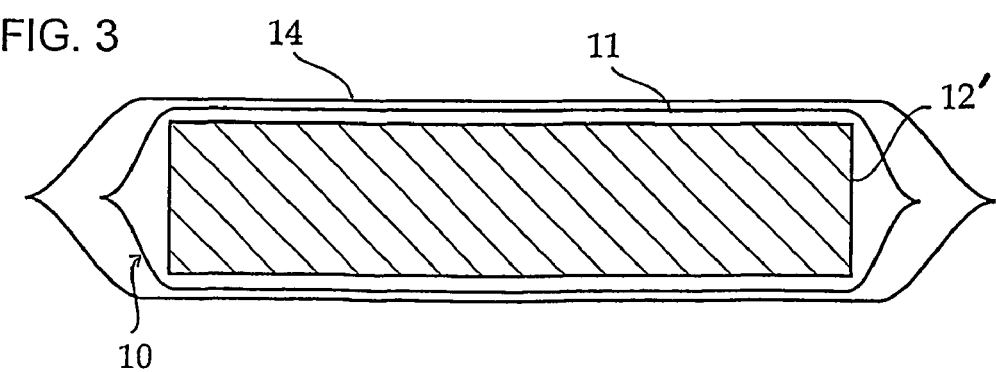
FIG. 3 is a cross section of a respiratory air filter in a second embodiment that is gas-impermeably packaged.

FIG. 3 depicts a respiratory air filter 10 in a second embodiment. This second embodiment is distinguished from the first embodiment of FIG. 1 in that, in the sleeve 11, instead of the four filter layers 12 and the three separation layers 13, only one filter layer 12' is provided and in that this filter layer 12' consists, in a first alternative, of activated carbon pellets that are bonded to each other using polyurethane foam.

In a second alternative, the filter layer 12' may be made from a matrix material, which may, for example, be open-cell polyurethane foam, and from activated carbon pellets that are bonded to the matrix material using an acrylate adhesive.

The respiratory air filter 10 according to this invention is low cost, compact, and easy to use. Consequently, it can be taken along with no problem by everyone everywhere at all times like a pack of paper tissues and also, for example, be kept handy in the glove compartment of automobiles or in the night stand of hotel rooms.

It will be apparent from the foregoing that while particular forms of the invention have been illustrated and described, various modifications can be made without departing from the spirit and scope of the invention. Accordingly, it is not intended that the invention be limited, except as by the appended claims.

The invention claimed is:

1. A respiratory air filter, with an electrostatically charged, air-permeable sleeve and at least one filter layer arranged inside the sleeve and containing activated carbon;
wherein the sleeve and the at least one filter layer form a deformable pad that can be pressed by the hand of a user in front of a facial feature of the user such as a mouth or nose, and the pad is deformable by pressure thus applied such that it conforms to an individual facial contour in the region of the facial feature such as the mouth or the nose.

2. A respiratory air filter according to claim 1, characterized in that the sleeve is formed from a textile fabric and the at least one filter layer is a flat mat.

3. A respiratory air filter according to claim 1, wherein the sleeve comprises a textile fabric and is nonwoven fabric that is manufactured, in particular, from polypropylene fibers.

4. A respiratory air filter according to claim 3, wherein the nonwoven fabric is a spun-bonded nonwoven fabric.

5. A respiratory air filter according to claim 4, wherein the nonwoven fabric is produced by melt blowing.

6. A respiratory air filter according to claim 1, characterized in that the sleeve is made from a material that has a weight per unit area of 30 to 40 $g/m^2$.

7. A respiratory air filter according to claim 1, wherein it has at least one filter layer made of nonwoven fabric.

8. A respiratory air filter according to claim 7, characterized in that each filter layer is made from a nonwoven fabric that has a weight per unit area of 170 to 210 $g/m^2$.

9. A respiratory air filter according to claim 1, characterized in that at least one filter layer is provided, which has activated carbon pellets that are bonded to each other.

10. A respiratory air filter according to claim 9, characterized in that the bonding of the activated carbon pellets is produced using an adhesive.

11. A respiratory air filter according to claim 10, characterized in that the adhesive is a polyurethane foam.

12. A respiratory air filter according to claim 9, characterized in that each filter layer with activated carbon pellets bonded to each other has a weight per unit area of 250 to 2700 $g/m^2$.

13. A respiratory air filter according to claim 9, characterized in that the proportion of activated carbon is between 70 and 90 wt.-%, and the proportion of adhesive is between 10 and 30 wt.-%.

14. A respiratory air filter according to claim 1, characterized in that at least one filter layer has a matrix material and activated carbon bonded thereto.

15. A respiratory air filter according to claim 14, characterized in that the matrix material is a polyurethane foam.

16. A respiratory air filter according to claim 14, characterized in that the activated carbon pellets are bonded to the matrix material using an adhesive.

17. A respiratory air filter according to claim 16, characterized in that the adhesive is an acrylate adhesive.

18. A respiratory air filter according to claim 14, characterized in that each filter layer that has activated carbon pellets bonded with the matrix material has a weight per unit area of 250 to 2700 $g/m^2$.

19. A respiratory air filter according to claim 14, characterized in that the proportion of activated carbon is between 70 and 90 wt.-%, and the proportion of matrix material and adhesive together is between 10 and 30 wt.-%, preferably between.

20. A respiratory air filter according to claim 9, characterized in that the pellets are granules and/or crystals.

21. A respiratory air filter according to claims 9, characterized in that the pellets have a grain size of 0.01 to 1.0 mm.

22. A respiratory air filter according to claim 9, characterized in that the activated carbon is loaded with oxygen and/or ozone.

23. A respiratory air filter according to claim 1, characterized in that at least one filter layer is provided that has a means to filter carbon monoxide.

24. A respiratory air filter according to claim 23, characterized in that the means to filter carbon monoxide is an oxidant that causes oxidation of the carbon monoxide to carbon dioxide.

25. A respiratory air filter according to claim 24, characterized in that the means includes at least one hopcalite.

26. A respiratory air filter according to claim 1, characterized in that at least two filter layers are arranged on top of each other and an air-permeable separation layer lies between each two adjacent filter layers.

27. A respiratory air filter according to claim 26, characterized in that each separation layer is made of nonwoven fabric.

28. A respiratory air filter according to claim 27, characterized in that the nonwoven fabric is produced from polyester fibers.

29. A respiratory air filter according to claim 27, characterized in that the nonwoven fabric is a perforated "spun-lace" nonwoven fabric.

30. A respiratory air filter according to claim 27, characterized in that each separation layer has a weight per unit area of 35 to 65 $g/m^2$.

31. A respiratory air filter according to claim 1, characterized in that the sleeve is enclosed in a gas-impermeable package, to be removed before use.

* * * * *